(12) United States Patent
Kitamura et al.

(10) Patent No.: US 8,168,706 B2
(45) Date of Patent: May 1, 2012

(54) GRANULAR COMPOSITION AND PRODUCTION THEREOF

(75) Inventors: Kazuhiro Kitamura, Osaka (JP); Yoshikazu Kimura, Osaka (JP); Kenji Kimura, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 461 days.

(21) Appl. No.: 12/361,861

(22) Filed: Jan. 29, 2009

(65) Prior Publication Data

US 2009/0197997 A1    Aug. 6, 2009

(30) Foreign Application Priority Data

Jan. 31, 2008  (JP) .................. 2008-020879

(51) Int. Cl.
| | |
|---|---|
| C08K 5/105 | (2006.01) |
| C07C 69/54 | (2006.01) |
| C07C 69/017 | (2006.01) |
| C07C 69/527 | (2006.01) |
| C07C 69/773 | (2006.01) |
| C09K 15/04 | (2006.01) |
| C09K 15/08 | (2006.01) |

(52) U.S. Cl. ........ 524/287; 560/130; 560/140; 560/205; 560/225; 252/397; 252/404

(58) Field of Classification Search .................. 524/287; 560/130, 140, 205, 225; 252/397, 404
See application file for complete search history.

(56) References Cited

U.S. PATENT DOCUMENTS

| 4,525,514 A | 6/1985 | Yachigo et al. | |
|---|---|---|---|
| 4,562,281 A | 12/1985 | Takahashi et al. | |
| 5,281,646 A * | 1/1994 | Yachigo et al. | ............... 524/291 |
| 6,800,228 B1 | 10/2004 | Semen | |
| 2001/0044518 A1 | 11/2001 | Hoffmann et al. | |
| 2003/0176546 A1* | 9/2003 | Hoshi et al. | ............... 524/323 |
| 2007/0100045 A1* | 5/2007 | Kimura et al. | ............... 524/291 |
| 2008/0023881 A1 | 1/2008 | Kubo | |
| 2008/0306192 A1* | 12/2008 | Kimura et al. | ............... 524/173 |

FOREIGN PATENT DOCUMENTS

| EP | 0534661 A1 | 3/1993 |
|---|---|---|
| EP | 1780236 A1 | 5/2007 |
| JP | 1-168643 A | 7/1989 |
| JP | 06-248140 A | 9/1994 |
| WO | 94/07946 A1 | 4/1994 |
| WO | 94/07950 A1 | 4/1994 |

* cited by examiner

Primary Examiner — Michael Pepitone
(74) Attorney, Agent, or Firm — Sughrue Mion, PLLC

(57) ABSTRACT

A granular composition comprising an organic compound having a melting point of 30 to 100° C., and a compound represented by the formula (1):

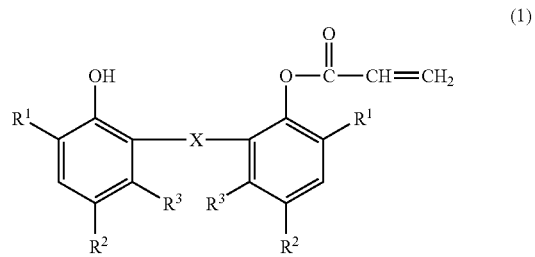

wherein $R^1$ and $R^2$ independently represent a hydrogen atom, a $C_{1-8}$ alkyl group, or a $C_{5-8}$ cycloalkyl group, $R^3$ represents a hydrogen atom or a $C_{1-8}$ alkyl group, and X represents a single bond, a sulfur atom, an oxygen atom, a $C_{1-8}$ alkylidene group or a $C_{5-8}$ cycloalkylidene group.

1 Claim, 1 Drawing Sheet

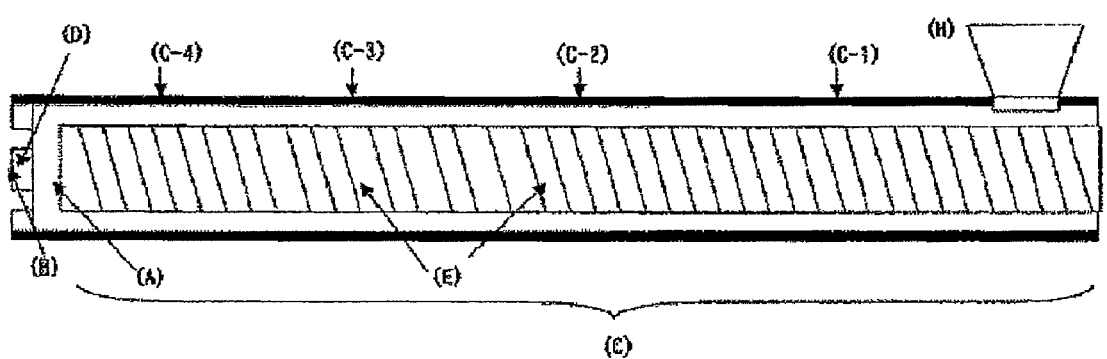

GRANULAR COMPOSITION AND PRODUCTION THEREOF

TECHNICAL FIELD

The present application has been filed claiming the Paris Convention priority based on the Japanese Patent Application No. 2008-020879 (filed on Jan. 31, 2008), the entire content of which is herein incorporated by reference.

The present invention relates a granular composition and a production method thereof.

BACKGROUND OF THE INVENTION

Patent document 1 discloses the compound represented by the following formula (I), which can be used for improving the heat stability of butadiene polymers. In the incorporation of said compound into butadiene polymers, the compound is generally dissolved into a hydrocarbon solvent, and then mixed into butadiene polymers, as described in Patent document 1.

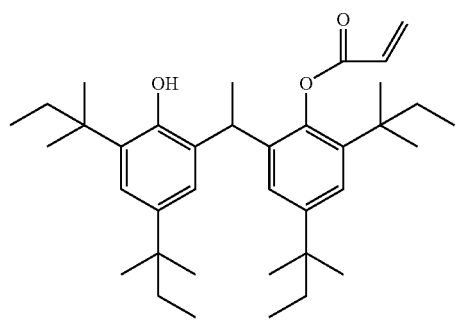

(I)

[Patent document 1] JP-A-1-168643 (Claims, page 6, the right lower column, lines 8 to 16)

DISCLOSURE OF INVENTION

In some cases, however, it is difficult for the compound represented by the formula (I) to be dissolved into a hydrocarbon solvent.

The present invention provides the inventions described in the following [1] to [7]:

[1] A granular composition comprising an organic compound having a melting point of 30 to 100° C., and a compound represented by the formula (1):

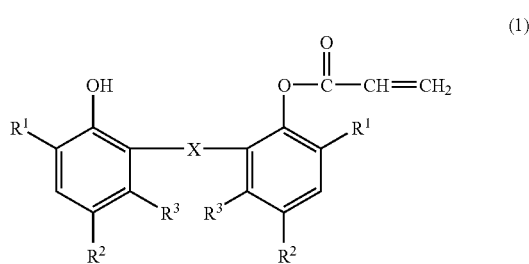

(1)

wherein $R^1$ and $R^2$ independently represent a hydrogen atom, an alkyl group having 1 to 8 carbon atoms, or a cycloalkyl group having 5 to 8 carbon atoms, $R^3$ represents a hydrogen atom or an alkyl group having 1 to 8 carbon atoms, and X represents a single bond, a sulfur atom, an oxygen atom, an alkylidene group having 1 to 8 carbon atoms or a cycloalkylidene group having 5 to 8 carbon atoms.

[2] The granular composition according to the above [1], wherein the compound represented by the formula (1) is 2-[1-(2-hydroxy-3,5-di-t-pentylphenyl)ethyl]-4,6-di-t-pentylphenyl acrylate or 2-t-butyl-6-(3-t-butyl-2-hydroxy-5-methylbenzyl)-4-methylphenyl acrylate.

[3] The granular composition according to the above [1] or [2], wherein the organic compound is at least one compound selected from the group consisting of a phenol antioxidant, a sulfur antioxidant, a phosphorus antioxidant, a hindered amine antioxidant, an ultraviolet absorber, an antistat and a lubricant.

[4] The granular composition according to any one of the above [1] to [3], which comprises 20 to 80% by weight of the organic compound, and 80 to 20% by weight of the compound represented by the formula (1), based on 100% by weight of the granular composition.

[5] A process for producing a granular composition, which comprises granulating an organic compound having a melting point of 30 to 100° C. and a compound represented by the formula (1):

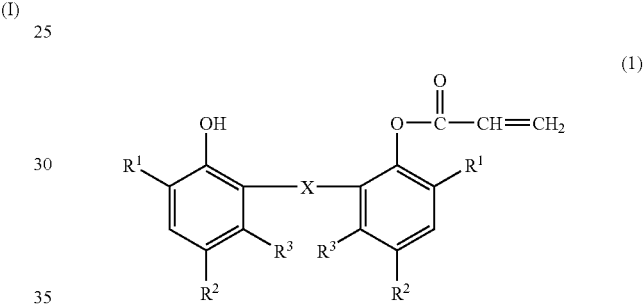

(1)

wherein $R^1$ and $R^2$ independently represent a hydrogen atom, an alkyl group having 1 to 8 carbon atoms, or a cycloalkyl group having 5 to 8 carbon atoms, $R^3$ represents a hydrogen atom or an alkyl group having 1 to 8 carbon atoms, and X represents a single bond, a sulfur atom, an oxygen atom, an alkylidene group having 1 to 8 carbon atoms or a cycloalkylidene group having 5 to 8 carbon atoms.

[6] The process according to the above [5], wherein the granulation is an extrusion granulation.

[7] A process for producing a thermoplastic polymer composition, which comprises mixing 0.01 to 2 parts by weight of the granular composition according to any one of the above [1] to [4], into 100 parts by weight of a thermoplastic polymer.

BRIEF DESCRIPTION OF DRAWINGS

FIG. 1 shows a typical cross-sectional diagram of a biaxial extruder used in Examples 5 to 12.

DESCRIPTION OF THE NUMERALS (A) Adapter part
Measurement point of maximum temperature of mixture in adapter part
(B) Outlet
(C) Heating and mixing part
(C1) to (C4)
Temperature setting points in cylinder part
(D) Die part
Temperature setting point in die part (E) Screw cylinder
(H) Material inlet

DETAILED DESCRIPTION OF THE INVENTION

The granular composition according to the present invention contains a compound represented by the formula (1) (hereinafter sometimes referred to as "compound (1)").

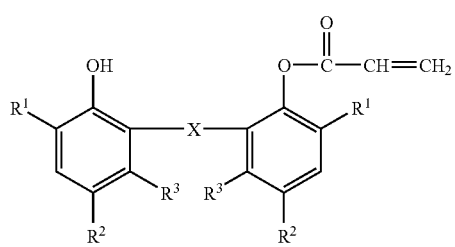

In the formula (1), $R^1$ and $R^2$ independently represent a hydrogen atom, an alkyl group having 1 to 8 carbon atoms, a cycloalkyl group having 5 to 8 carbon atoms.

Examples of the alkyl group include a methyl group, an ethyl group, a n-propyl group, an i-propyl group, a n-butyl group, an i-butyl group, a t-butyl group, a n-pentyl group, an i-pentyl group, a t-pentyl group, a 2-ethylhexyl group, etc.

Examples of the cycloalkyl group include a cyclopentyl group, a cyclohexyl group, a cyclooctyl group, a 3-methylcyclopentyl group, a 4-methylcyclopentyl group, a 3-methylcyclohexyl group, etc.

As the $R^1$ and $R^2$, a methyl group, a t-butyl group or a t-pentyl group is preferred.

$R^3$ represents a hydrogen atom or an alkyl group having 1 to 8 carbon atoms. Examples of the alkyl group of $R^3$ include the alkyl groups exemplified in the above $R^1$, etc.

X represents a single bond, a sulfur atom, an oxygen atom, an alkylidene group having 1 to 8 carbon atoms or a cycloalkylidene group having 5 to 8 carbon atoms.

Examples of the alkylidene group include a methylene group, an ethylidene group, a propylidene group, a butylidene group, etc.

Examples of the cycloalkylidene group include a cyclopentylidene group, a cyclohexylidene group, etc.

As the X, a methylene group, an ethylidene group or a butylidene group is preferred.

The melting point of the compound (1) is generally 70 to 220° C., and preferably 100 to 140° C.

Examples of the compound (1) include 2-[1-(2-hydroxy-3,5-di-t-pentylphenyl)ethyl]-4,6-di-t-pentylphenyl acrylate, 2-t-butyl-6-(3-t-butyl-2-hydroxy-5-methylbenzyl)-4-methylphenyl acrylate, 2,4-di-t-butyl-6-{1-(3,5-di-t-butyl-2-hydroxyphenyl)ethyl}phenyl acrylate, 2-t-butyl-6-{1-(3-t-butyl-2-hydroxy-5-methylphenyl)ethyl}-4-methylphenyl acrylate, 2-t-butyl-6-{1-(3-t-butyl-2-hydroxy-5-methylphenyl)propyl}-4-methylphenyl acrylate, 2-t-butyl-6-{1-(3-t-butyl-2-hydroxy-5-propylphenyl}ethyl)-4-propylphenyl acrylate, 2-t-butyl-6-{1-(3-t-butyl-2-hydroxy-5-isopropylphenyl)ethyl}-4-isopropylphenyl acrylate, etc.

Among them, 2-t-butyl-6-(3-t-butyl-2-hydroxy-5-methylbenzyl)-4-methylphenyl acrylate or 2-[1-(2-hydroxy-3,5-di-t-pentylphenyl)ethyl]-4,6-di-t-pentylphenyl acrylate is preferred.

The compound (1) can be produced according to the known methods, for example, those described in JP-A-59-144733, JP-A-1-168643, JP-A-4-264051, U.S. Pat. Nos. 4,525,514, 4,562,281, 4,365,032, etc.

The granular composition according to the present invention contains an organic compound having a melting point of 30 to 100° C., preferably 40 to 90° C., and more preferably 45 to 80° C. It is preferred that the melting point is not less than 30° C., since the morphological stability of the resultant granular composition tends to be improved. In addition, it is preferred that the melting point is not more than 100° C., since no high temperature equipment is needed for the granulation.

The organic compound is particularly preferably at least one compound selected from the group consisting of a phenol antioxidant, a sulfur antioxidant, a phosphorus antioxidant, a hindered amine antioxidant, an ultraviolet absorber, an antistat and a lubricant.

Examples of the organic compound include a phenol antioxidant such as n-octadecyl-3-(4-hydroxy-3,5-di-t-butylphenyl)propionate (melting point: 50 to 55° C.), 2,6-di-t-butyl-4-methylphenol (melting point: 69° C. (freezing point)) 2,2-thio-diethylene-bis-[3-(3,5-di-t-butyl-4-hydroxyphenyl) propionate] (melting point: not less than 63° C.), tri-ethylene glycol-bis-[3-(3-t-butyl-5-methyl-4-hydroxyphenyl)propionate] (melting point: 76 to 79° C.), etc.;

a sulfur antioxidant such as 3,3'-thiodipropionic acid di-n-dodecyl ester (melting point: 40 to 42° C.), 3,3'-thiodipropionic acid di-n-tetradecyl ester (melting point: 49 to 54° C.), 3,3'-thiodipropionic acid di-n-octadecyl ester (melting point: 65 to 67° C.), tetrakis(3-dodecylthiopropionic acid)pentaerythrityl ester (melting point: about 46° C.), etc.;

a phosphorus antioxidant such as tetrakis(2,4-di-t-butylphenyl)-4,4'-biphenylene diphosphonite (melting point: 75 to 90° C.), bis[2-methyl-4,6-bis(1,1-dimethylethyl)phenol]phosphoric acid ethyl ester (melting point: 89 to 92° C.), etc.;

a hindered amine antioxidant such as sebacic acid bis(2,2,6,6-tetramethyl-4-piperidyl)ester (melting point: 81 to 86° C.), 2,2,6,6-tetramethyl-4-piperidyl methacrylate (melting point: 58° C.), etc.;

an ultraviolet absorber such as 2-hydroxy-4-n-octyloxy benzophenone (melting point: not less than 45° C.), 2-(2H-benzotriazol-2-yl)-4,6-di-t-pentyl phenol (melting point: not less than 77° C.), 2-[4,6-bis(2,4-dimethylphenyl)-1,3,5-triazin-2-yl]-5-(octyloxy)phenol (melting point: 87 to 89° C.), etc.;

an antistat such as glycerol monostearate (melting point: 65 to 70° C.), glycerol monocaprate (melting point: 46° C.), glycerol monolaurate (melting point: 57° C.), citric acid fatty acid monoglyceride (melting point: 59° C.), etc.;

a lubricant such as oleic amide (melting point: about 72 to 77° C.), erucic amide (melting point: 79 to 81° C.), propylene glycol monostearate (melting point: 42 to 48° C.), stearyl stearate (melting point: 53 to 59° C.), sorbitan stearate (melting point: 52 to 58° C.), etc.; and the like.

The organic compound to be used in the present invention includes preferably octadecyl-3-(4-hydroxy-3,5-di-t-butylphenyl)propionate, glycerol monostearate, 3,3'-thiodipropionic acid di-n-tetradecyl ester and 3,3'-thiodipropionic acid di-n-octadecyl ester, and particularly preferably octadecyl-3-(4-hydroxy-3,5-di-t-butylphenyl)-propionate.

The granular composition according to the present invention contains preferably 15 to 85% by weight, more preferably 20 to 80% by weight, particularly preferably 25 to 75% by weight of the organic compound, based on 100% by weight of the granular composition. In addition, the granular composition contains preferably 85 to 15% by weight, more preferably 80 to 20% by weight, particularly preferably 75 to 25% by weight of the compound represented by the formula (1), based on 100% by weight of the granular composition.

The granular composition according to the present invention may contain an additive other than the compound (1) and the above-mentioned organic compound, i.e., an additive having a melting point of less than 30° C. or a melting point of more than 100° C.

Examples of such additive include a phenol antioxidant having a melting point of more than 100° C., such as 3,9-bis [2-{3-(3-t-butyl-4-hydroxy-5-methylphenyl)propionyloxy}-1,1-dimethylethyl]-2,4,8,10-tetraoxaspiro[5•5]undecane (melting point: 110 to 130° C.), tetrakis{3-(3,5-di-t-butyl-4-hydroxyphenyl)-propionic acid}pentaerythrityl ester (melting point: 110 to 130° C.), 1,3,5-trimethyl-2,4,6-tris(3,5-di-t-butyl-4-hydroxybenzyl)benzene (melting point: 240 to 245° C.), tris(3,5-di-t-butyl 4-hydroxybenzyl)isocyanurate (melting point: 218 to 223° C.), 1,3,5-tris(4-t-butyl-3-hydroxy-2,6-dimethylbenzyl)-1,3,5-triazine-2,4,6-(1H,3H, 5H)-trion (melting point: 159 to 162° C.), 2,2'-methylenebis (6-t-butyl-4-methylphenol) (melting point: not less than 128° C.), 4,4'-butylidenebis(6-t-butyl-3-methylphenol) (melting point: not less than 209° C.), 4,4'-thiobis(6-t-butyl-3-methylphenol) (melting point: not less than 160° C.), etc.;

an ultraviolet absorber having a melting point of more than 100° C., such as 2-(2-hydroxy-5-methylphenyl)benzotriazole (melting point: 127° C.), 2-(3-t-butyl-2-hydroxy-5-methylphenyl)-5-chlorobenzotriazole (melting point: 137° C.), 2,4-di-t-butylphenyl 3,5-di-t-butyl-4-hydroxybenzoate (melting point: 192° C.), etc.;

a light stabilizer having a melting point of more than 100° C., such as poly[{6-(1,1,3,3-tetramethylbutyl)amino-1,3,5-triazine-2,4-diyl}[(2,2,6,6-tetramethyl-4-piperidyl)imino)-1,6-hexamethylene{(2,2,6,6-tetramethyl-4-piperidyl) imino}] (melting point: 100 to 135° C.), etc.; and the like.

The granular composition according to the present invention may contain an additive having a melting point of less than 30° C. or a melting point of more than 100° C., such as a nucleating agent, a lubricant, an antistat, a flame retardant, a filler, a pigment, a plasticizer, an antiblocking agent, a surfactant, a process aid, a blowing agent, an emulsifier, a brightening agent, a neutralizing agent (e.g., calcium stearate, hydrotalcites, etc.), a binder, etc.

The content of the additive, which is other than the compound (1) and the above-mentioned organic compound, in the granular composition according to the present invention is generally not more than 60% by weight, and preferably not more than 40% by weight, based on 100% by weight of the granular composition.

The process for producing the granular composition according to the present invention comprises granulating an organic compound having a melting point of 30 to 100° C. and a compound represented by the formula (1). Examples of the granulation method include a compression granulation method using a granulator such as a pellet mill and a roller compactor (TURBO KOGYO CO., LTD.); an agitation granulation method using a granulator such as a high-speed mixer (FUKAE POWTEC CO., LTD.) and a continuous agitating granulator (OKAWARA MFG. CO., LTD.); an extrusion granulation method; and a combination of these methods.

The granulation temperature in the granulation process includes, for example, a temperature around the melting point of the organic compound, in particular a temperature within about ±5° C. of the melting point of the organic compound having a lowest melting point. The granulation temperature can be set, for example, by utilizing the heat generated by the shearing force in the kneading of a mixture of the organic compound, the compound (1), and optionally an additive, etc. in a granulator, by passing a heat medium through a jacket, etc. of a granulator to increase the temperature of the granulator, and by using a combination of these methods.

As the granulation method, an extrusion granulation method is preferred, since a granular composition tends to be stably produced by using the method. Hereinafter, the extrusion granulation method will be described in more detail. Examples of the extrusion granulation method include a method comprising granulating the compound (1), the organic compound, and optionally an additive, etc. by means of an extruder to obtain a granular composition, etc.

Examples of the extruder include a disk pelleter, a screw extruder, a monoaxial extruder, a biaxial extruder or a combined extruder of these extruders (e.g., a monoaxial and biaxial extruder, etc.).

In particular, a biaxial extruder and a disk pelleter are preferred.

The granular composition generally has a minimum length of at least 1 mm. The "minimum length" refers to the minimum value of the lengths of the straight lines passing through the center of gravity of the granular composition and connecting both ends of the granular composition.

For example, in case of a spherical granular composition, the minimum length is the diameter of the sphere. The diameter of the sphere is generally about 1 mm to 6 mm, and preferably about 1 mm to 4 mm.

In general, a columnar granular composition is obtained by an extrusion granulation method. When the height of the column is greater than the diameter of the cross-section of the column, the diameter of the cross-section of the column is the minimum length. When the height of the column is lower than the diameter of the cross-section of the column, the height of the column is the minimum length. In this case, the minimum length of the columnar granular composition is generally not less than 1 mm, preferably about 1 mm to 6 mm, and more preferably about 1 to 4 mm.

The granular composition according to the present invention can be used as a stabilizer for thermoplastic polymers, since it improves the heat stability of the polymers.

The granular composition according to the present invention can be rapidly dissolved into a hydrocarbon solvent.

Examples of the hydrocarbon solvent include an aliphatic hydrocarbon solvent such as n-heptane, n-hexane, etc.; a cycloaliphatic hydrocarbon solvent such as cycloheptane, cyclohexane, etc.; an aromatic hydrocarbon solvent such as benzene, toluene, xylene, etc.; and the like. Among them, an aliphatic hydrocarbon solvent or a cycloaliphatic hydrocarbon solvent is preferred. In particular, n-hexane or cyclohexane is preferred.

The granular composition according to the present invention has a dissolution rate of generally not less than 0.5 g/min, and preferably 0.5 to 0.7 g/min. The "dissolution rate" can be determined as follows: 3.0 g of the granular composition is added into a beaker containing 50.0 g of cyclohexane, and the mixture is rotated with a fan-type agitation blade having a diameter of 38 mm. Then, a period from the time when the rotation frequency is reached to 100 rpm, to the time when the complete dissolution is attained is measured. From the measurement value, an amount (g) of the granular composition to be dissolved per one minute, i.e., a dissolution rate (g/min) can be calculated.

The granular composition according to the present invention is superior in hardness. In particular, the granular composition has a hardness of not less than 1.0 kg, preferably not less than 1.5 kg, as measured by a Kiya hardness tester. A granular composition having a hardness of not more than 3.0 kg is preferred, since it tends to have a superior dispersibility into a thermoplastic polymer.

In general, the granular composition according to the present invention is dissolved into a hydrocarbon solvent, and then incorporated into a thermoplastic polymer. The granular composition may be incorporated into a thermoplastic polymer by kneading, etc., without being dissolved into a hydrocarbon solvent. The dispersibilities of the compound (1) and the organic compound (2) in the incorporation of the granular composition according to the present invention into a thermoplastic polymer are typically substantially the same as in the case of the incorporation of the compound (1) and the organic compound (2) separately into a thermoplastic polymer.

Examples of the thermoplastic polymer to be used in the present invention include a polyolefin [such as, a propylene resin, an ethylene resin (a high-density polyethylene (HD-PE), a low-density polyethylene (LD-PE), a linear low-density polyethylene (LLDPE), an ethylene-ethyl acrylate copolymer, an ethylene-vinyl acetate copolymer, an ethylene-vinyl alcohol copolymer, an ethylene-methyl methacrylate copolymer, etc.), a cyclic polyolefin, a methylpentene polymer], a polystyrene [a poly(p-methylstyrene), a poly(α-methylstyrene), an acrylonitrile-styrene copolymer, a special acrylic rubber-acrylonitrile-styrene copolymer, an acrylonitrile-chlorinated polyethylene-styrene copolymer, etc.], a chlorinated resin (e.g., a chlorinated polyethylene, a polychloroprene, a chlorinated rubber, a polyvinyl chloride, a polyvinylidene chloride), a methacrylic resin, a fluorine resin, a polyacetal, a grafted polyphenylene ether resin, a polyphenylene sulfide resin, a polyurethane, a polyamide, a polyester resin (e.g., a polyethylene terephthalate, a polybutylene terephthalate, a polylactic acid, etc.), a polycarbonate, a polyacrylate, a polysulfone, a polyether ether ketone, a polyether sulfone, an aromatic polyester resin, a diallyl phthalate prepolymer, a silicone resin, a polyisoprene, a butadiene polymer, etc. Among them, an ethylene resin, a propylene resin, a polystyrene or a butadiene polymer is preferred. In particular, a propylene resin or a butadiene polymer is preferred.

The "propylene resin" refers to a polyolefin containing a structural unit derived from propylene. Examples thereof include a crystalline propylene homopolymer; a propylene-ethylene random copolymer; a propylene-α-olefin random copolymer; a propylene-ethylene-α-olefin copolymer; a polypropylene block copolymer comprising a propylene homopolymer component or a copolymer component mainly comprising propylene, and a copolymer component comprising propylene and ethylene and/or an α-olefin; and the like.

When the propylene resin is used as a thermoplastic polymer in the present invention, the propylene resin may be used individually or in a blend of two or more propylene resins.

Examples of the "α-olefin" generally include an α-olefin having 4 to 12 carbon atoms such as 1-butene, 1-pentene, 1-hexene, 4-methyl-1-pentene, 1-octene, 1-decene, etc., more preferably 1-butene, 1-hexene and 1-octene.

Examples of the "propylene-α-olefin random copolymer" include a propylene-1-butene random copolymer, a propylene-1-hexene random copolymer, a propylene-1-octene random copolymer, etc.

Examples of the "propylene-ethylene-α-olefin copolymer" include a propylene-ethylene-1-butene copolymer, a propylene-ethylene-1-hexene copolymer, a propylene-ethylene-1-octene copolymer, etc.

Examples of the "copolymer component mainly comprising propylene" in the "polypropylene block copolymer comprising a propylene homopolymer component or a copolymer component mainly comprising propylene, and a copolymer component comprising propylene and ethylene and/or an α-olefin" include a propylene-ethylene copolymer component, a propylene-1-butene copolymer component, a propylene-1-hexene copolymer component, etc.

Examples of the "copolymer component comprising propylene and ethylene and/or an α-olefin" include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, a propylene-1-octene copolymer component, etc.

In addition, the content of ethylene and/or an α-olefin having 4 to 12 carbon atoms in the "copolymer component comprising propylene and ethylene and/or an α-olefin" is generally 0.01 to 20% by weight.

Examples of the "polypropylene block copolymer comprising a propylene homopolymer component or a copolymer component mainly comprising propylene, and a copolymer component comprising propylene and ethylene and/or an α-olefin" include a propylene-ethylene block copolymer, a (propylene)-(propylene-ethylene) block copolymer, a (propylene)-(propylene-ethylene-1-butene) block copolymer, a (propylene)-(propylene-ethylene-1-hexene) block copolymer, a (propylene)-(propylene-1-butene) block copolymer, a (propylene)-(propylene-1-hexene) block copolymer, a (propylene-ethylene)-(propylene-ethylene-1-butene) block copolymer, a (propylene-ethylene)-(propylene-ethylene-1-hexene) block copolymer, a (propylene-ethylene)-(propylene-1-butene) block copolymer, a (propylene-ethylene)-(propylene-1-hexene) block copolymer, a (propylene-1-butene)-(propylene-ethylene) block copolymer, a (propylene-1-butene)-(propylene-ethylene-1-butene) block copolymer, a (propylene-1-butene)-(propylene-ethylene-1-hexene) block copolymer, a (propylene-1-butene)-(propylene-1-butene) block copolymer, a (propylene-1-butene)-(propylene-1-hexene) block copolymer, etc.

The propylene resin to be used as a thermoplastic polymer in the present invention is preferably a crystalline propylene homopolymer, and a polypropylene block copolymer comprising a propylene homopolymer component or a copolymer component mainly comprising propylene, and a copolymer component comprising propylene and ethylene and/or an α-olefin having 4 to 12 carbon atoms, more preferably a polypropylene block copolymer comprising a propylene homopolymer component or a copolymer component mainly comprising propylene, and a copolymer component comprising propylene and ethylene and/or an α-olefin having 4 to 12 carbon atoms.

The butadiene polymer in the present invention is a polymer containing a structural unit derived from butadiene, or a hydrogenation product of the polymer. Examples of the butadiene polymer include a styrene-butadiene copolymer such as a styrene-butadiene rubber (SBR), a styrene-butadiene-styrene copolymer (SBS), a styrene-butadiene block copolymer (SB), etc.; a polybutadiene, which is a homopolymer of butadiene; an acrylonitrile-butadiene copolymer; an acrylonitrile-butadiene-styrene copolymer (ABS); and the like.

The butadiene polymer can be produced by a general method such as a solution polymerization method, an emulsion polymerization method, a bulk polymerization method, etc. The butadiene polymer may be a resin or a rubber. When the butadiene polymer is a polybutadiene, it may be a polybutadiene rubber produced by a solution polymerization method, or a polybutadiene rubber produced by an emulsion polymerization.

The granular composition according to the present invention may be incorporated into a thermoplastic polymer in an amount of generally not more than 5 parts by weight, preferably not less than 0.0001 parts by weight and not more than 5 parts by weight, more preferably not less than 0.0005 parts by weight and not more than 3 parts by weight, particularly preferably 0.01 to 2 parts by weight, based on 100 parts by weight of the thermoplastic polymer.

The granular composition according to the present invention can be rapidly dissolved into a hydrocarbon solvent.

EXAMPLES

Hereinafter, the present invention will be described in more detail by way of Examples and Comparative examples.

As the compound (1), 2-[1-(2-hydroxy-3,5-di-t-pentylphenyl)ethyl]-4,6-di-t-pentylphenyl acrylate (hereinafter sometimes referred to as "compound (1-1)"; melting point: 115° C., Sumitomo Chemical Co., Ltd.) was used.

As the organic compound, n-octadecyl-3-(4-hydroxy-3,5-di-t-butylphenyl)propionate (hereinafter sometimes referred to as "compound (2)"; melting point: 50 to 55° C., a phenol antioxidant) was used.

Example 1

Firstly, 4260 g of the compound (1-1) and 2130 g of the organic compound (2) were mixed and charged into a disk pelleter (model F-5, Dalton Co., Ltd.). Then, a rotating roller was operated at a rotational frequency of 132 rpm, so that the material temperature was increased to a temperature of 46 to 49° C. The material was extruded via a disk die under the roller, and then immediately cut to obtain 6300 g of a substantially columnar granular composition (a) (cross-sectional diameter: 3 mm, height: 2 to 6 mm). The resulting granular composition (a) had a hardness of 1.86 kg as measured by the following measurement method for hardness.

(Measurement Method for Hardness of Granular Composition)

The measurement was carried out by using a hardness tester 1600 (Kiya Seisakusho Ltd.). The resulting granular composition was placed on a specimen support of the hardness tester and pressurized by gradually lowering a pressurizing attachment onto the granular composition by turning a handle. The scale of the pressurizing attachment was read off when the granular composition was crushed by pressure. The same test procedure was repeated 10 times, and the average of the measurement values was regarded as the hardness of the granular composition.

(Measurement Method for Dissolution Rate of Granular Composition)

Into a beaker (volume: 100 ml, external diameter: 55 mm, height: 70 mm, PYREX IWAKI) containing 50.0 g of cyclohexane was added 3.0 g of the granular composition (a), and a fan-type agitation blade with a diameter of 38 mm was rotated at a rotation frequency of 100 rpm. It took 5.78 minutes until the granular composition was completely dissolved. The dissolution rate (a weight of the granular composition dissolved per one minute) was 0.519 g/min.

Example 2

The substantially columnar granular composition (b) was obtained in the same manner as in Example 1, except using 3000 g of the compound (1-1) and 3000 g of the organic compound (2). The hardness and the dissolution rate were measured in the same manner as in the Example 1. The results are shown in Table 1 along with those in Example 1.

Example 3

The substantially columnar granular composition (c) was obtained in the same manner as in Example 1, except using 1350 g of the compound (1-1) and 5400 g of the organic compound (2). The hardness and the dissolution rate were measured in the same manner as in the Example 1. The results are shown in Table 1.

Example 4

The substantially columnar granular composition (d) was obtained in the same manner as in Example 1, except using 5720 g of the compound (1-1) and 1430 g of the organic compound (2) The hardness and the dissolution rate were measured in the same manner as in the Example 1. The results are shown in Table 1.

Example 5

Into a biaxial extruder (30 mmφ, Nakatani) as shown in FIG. 1 was charged a mixture of 2000 g of the compound (1-1) and 1000 g of the organic compound (2). The heater temperatures of a cylinder part were set to C1: 40° C., C2: 43° C., C3: 43° C., C4: 43° C., A: 49° C. and D: 49° C., respectively (each of the heater positions is shown in FIG. 1). The mixture was extruded at a screw rotation of 40 rpm, the resulting strand was cooled to a room temperature and cut to obtain 3000 g of a substantially columnar granular composition (e) (cross-sectional diameter: 3 mm, height: 3 to 6 mm). The hardness and the dissolution rate were measured in the same manner as in the Example 1. The results are shown in Table 1.

Example 6

The substantially columnar granular composition (f) was obtained in the same manner as in Example 5, except setting the heater temperatures to C1: 35° C., C2: 40° C., C3: 40° C., C4: 40° C., A: 47° C. and D: 47° C., respectively. The results are shown in Table 1.

Comparative Example 1

Into a 10 L Henschel mixer were added 1000 g of the compound (1-1) and 500 g of the organic compound (2). Then, the content thereof was mixed at a rotational frequency of an agitating blade of 2400 rotations for 30 seconds to obtain 1500 g of a mixture. The dissolution rate of the mixture was measured in the same manner as in the Example 1. The results are shown in Table 1.

TABLE 1

|  | Granular composition | Dissolution rate (g/min) | Hardness of granular composition (kg) |
| --- | --- | --- | --- |
| Example 1 | a | 0.519 | 1.86 |
| Example 2 | b | 0.619 | 2.31 |
| Example 3 | c | 0.708 | 2.14 |
| Example 4 | d | 0.519 | 2.04 |
| Example 5 | e | 0.603 | 2.81 |
| Example 6 | f | 0.603 | 2.61 |
| Comparative Example 1 | mixture | 0.462 | — |

Example 7

Firstly, 1500 g of a styrene-butadiene-styrene copolymer (SBS, MFR=5 (230° C., 21.2 N (2.16 kg·f)) and 7.5 g of the granular composition (a) obtained in Example 1 were dry-blended. Then, the blend was charged into a biaxial extruder (30 mm$\phi$, NAKATANI) through a hopper. The blend was extruded at a screw rotational frequency of 50 rpm at an extrusion temperature (C1 to C4) of 180° C. to obtain a columnar pellet of a thermoplastic polymer composition.

Examples 8 to 12

Thermoplastic polymer compositions were produced in the same manner as in Example 7, except using a granular composition (b), (c), (d), (e) or (f).

INDUSTRIAL APPLICABILITY

The granular composition according to the present invention can be rapidly dissolved into a hydrocarbon solvent.

The invention claimed is:

1. A granular composition comprising 20 to 80% by weight of n-octadecyl-3-(4-hydroxy-3,5-di-t-butylphenyl)propionate and 80 to 20% by weight of 2-[1-(2-hydroxy-3,5-di-t-pentylphenyl)ethyl]-4,6-di-t-pentylphenyl acrylate, based on 100% by weight of the granular composition.

* * * * *